Oct. 27, 1953  F. V. HASSELBLAD  2,656,771
PHOTOGRAPHIC PLATE OR FILM HOLDER
Filed Oct. 16, 1951

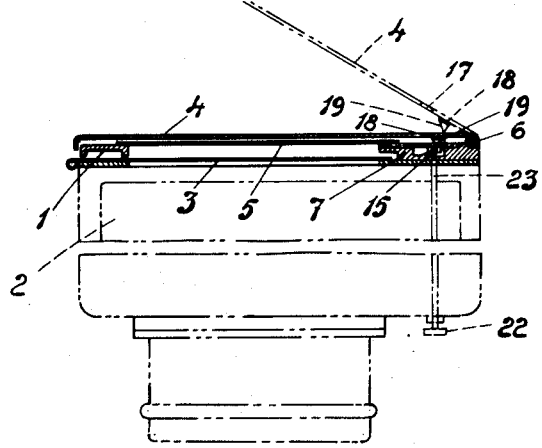
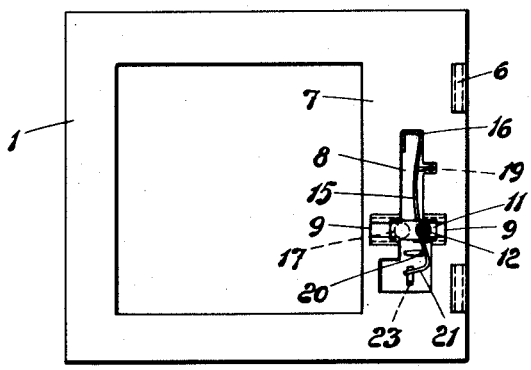
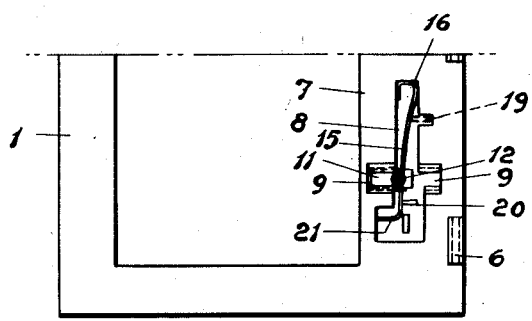

INVENTOR.
FRITZ VICTOR HASSELBLAD
BY
Linton and Linton
ATTORNEYS

Patented Oct. 27, 1953

2,656,771

UNITED STATES PATENT OFFICE 2,656,771

PHOTOGRAPHIC PLATE OR FILM HOLDER

Fritz Victor Hasselblad, Goteborg, Sweden

Application October 16, 1951, Serial No. 251,521
In Sweden November 1, 1947

1 Claim. (Cl. 95—71)

The present invention refers to photographic plate or film holders provided with a hinged cover and an exposure-indicator comprising an indicator plate slidable between two end positions behind an inspection opening in said cover and adapted to show, according to its position, whether a plate or film in the holder has been exposed.

The object of the invention is to provide an exposure-indicator of the kind referred to which is simple in construction and reliable in its action.

Figure 4:
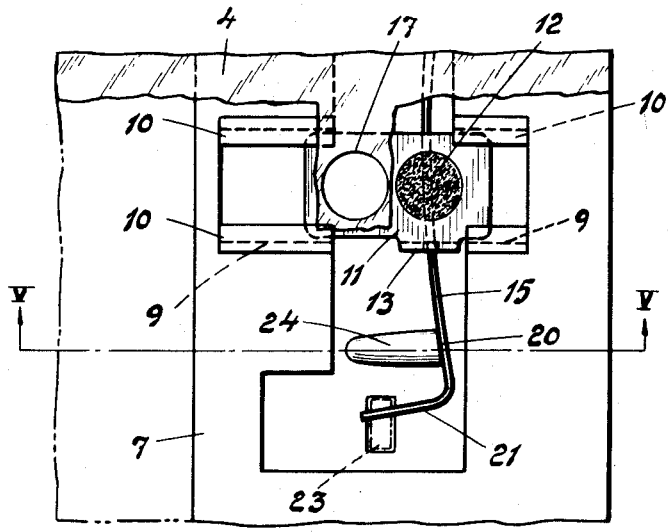
Figure 5:
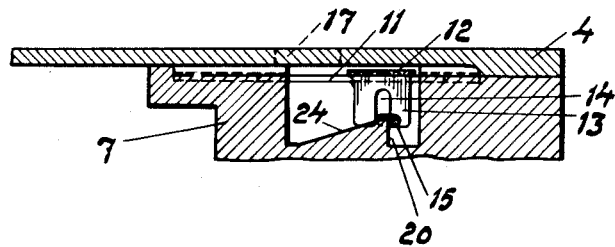
Figure 6:
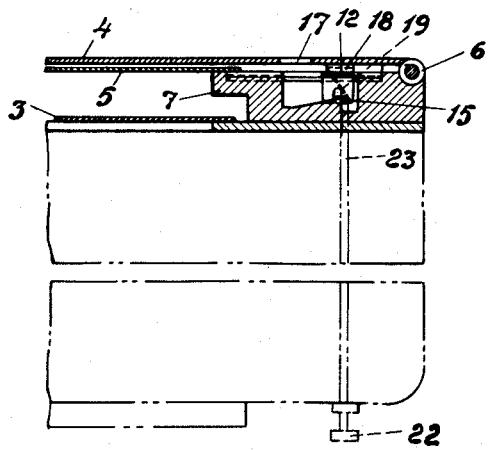

An embodiment of the invention is shown by way of example in the accompanying drawings, in which Figure 1 is a cross-section through a plate holder provided with an exposure-indicator according to the invention, Figure 2 is a rear view of the plate holder with the cover removed, Figure 3 is a fragment of Figure 2 with the exposure-indicator in another position, Figure 4 is a fragmentary view to a larger scale of the indicator plate and associated parts hereinafter described with the exposure-indicator in the same position as in Figure 2, Figure 5 is a section along the line V—V in Figure 4, and Figure 6 is a similar section with the cover in closed position.

In the drawings 1 denotes the frame of the plate holder which is detachably secured in conventional manner to the camera housing 2. At its front side the plate holder is provided with a slide cover 3, and at its rear side with a hinged cover 4 which when opened enables a photographic plate 5 to be placed in the holder and removed therefrom after exposure. The hinges 6 of the cover 4 are situated near the outer edge of one (7) of the side pieces of the frame 1. In the rear surface of said frame piece 7 there is cut out an elongated recess 8 provided with two laterally projecting enlargements 9 situated opposite each other. In these enlargements 9 there is an indicator plate 11 slidable on guides 10, and said indicator plate 11 is provided near one end with a coloured field 12. The plate 11 is provided with a lug 13 bent down at right angles to the plane of the plate, and in said lug 13 there is provided a slot 14 perpendicular to said plane. Said slot 14 embraces by its side edges a wire spring 15 disposed in the recess 8 in the direction of the length of the same and having one end portion 16 secured at one end of said recess 8. The wire spring 15 is so formed and arranged that it normally keeps the plate 11 in the position shown in Figures 1, 2, 4 and 5, in which the coloured field 11 is not visible through an inspection window or opening 17 provided in the cover 4 in front of the plate 11. To the inside of the hinged cover 4 there is secured a tooth 18 having an oblique edge 19. This tooth 18 is so disposed in relation to the spring 15 that, as the cover 4 is swung into its closed position, the said tooth engages the spring at a distance from its end 16 causing the spring to bend between said end 16 and a fixed abutment 20 provided at a distance from the other end of the spring. This loads and conditions the spring to press towards the left-hand of Figure 4. Thus, as the wire spring is released from the engagement with the abutment 20 by means of a mechanism hereinafter described, the spring exerts itself and slides the plate 11 to the position shown in Figure 3, in which the coloured field 12 is visible through the inspection opening 17. The free end of the wire spring 15 is provided with a bent end portion 21, which, when the plate holder is attached to the camera housing, is situated in the path of movement of a member 23 movable with the trigger or the like 22 of the camera (Figure 1), so that as the trigger or equivalent is operated in order to release the shutter mechanism of the camera the member 23 moves the wire spring 15 out of engagement with the abutment 20, whereupon the wire spring 15 is released and slides the plate 11 to the position shown in Figure 3. When the wire spring 15 and the plate 11 are in this position, and the cover 4 is swung to its open position, the action of the oblique edge 19 of the tooth 18 on the spring ceases, and the latter thus returns, sliding on an oblique guiding surface 24, to the position shown in Figure 4 and moves the plate 11 back to the initial position. It is to be observed that the wire spring 15 has to be so secured and shaped that, at the end of its last mentioned movement, it engages the abutment 20, so that this, as the cover 4 is again swung to closed position, retains the wire spring 15, until it is once more released by the member 23.

It will be obvious that, after having placed a photographic plate in the holder, the coloured field 12 of the plate 11 is not visible through the window 17 until the photographic plate of the holder attached to the camera has been exposed, and the device indicates under all circumstances if the photographic plate in the holder has been exposed or not.

What I claim is:

An exposure indicating device for camera photographic plate or film holders comprising a plate holder frame for being detachably connected to the camera, an indicator plate having an indicating mark provided thereon and being slidably mounted on said frame, a wire spring connected at one end to said frame and at its medial portion to said slide for normally tending to retain said slide with its mark in its non-indicating position, a cover pivotally connected to said frame and having a sight opening positioned for viewing the mark on said plate when in its indicating position, a tooth mounted on said cover arranged for pressing against said spring upon the closing of said cover on said plate and tending to move said spring and its plate to its indicating position relative to said cover sight opening, an abutment connected to said frame and positioned with the opposite end of said spring normally retained thereby with said plate in its non-indicating position, means capable of being connected to and operated by the shutter release mechanism trigger of the camera for moving said spring out of engagement with said abutment whereby said plate with its mark is released for moving to its indicating position and said abutment having a tapered side positioned for guiding said spring back into engagement with said abutment during its return movement to its normal position upon the opening of said cover.

FRITZ VICTOR HASSELBLAD.

No references cited.